United States Patent [19]

Reier

[11] Patent Number: 4,618,353

[45] Date of Patent: Oct. 21, 1986

[54] FILTER BAG ASSEMBLY

[76] Inventor: Gerald J. Reier, P.O. Box 79141, Fort Worth, Tex. 76179

[21] Appl. No.: 757,943

[22] Filed: Jul. 23, 1985

[51] Int. Cl.$^4$ ............................................. B01D 46/02
[52] U.S. Cl. ...................................... 55/378; 55/304; 55/341 NT; 248/95; 24/197; 24/343; 29/452; 29/157 R
[58] Field of Search ................. 24/193, 197, 170, 343; 248/95, 101; 55/378, 379, 304, 305, 341 R, 341 NT; 29/446, 452, 157 R

[56] References Cited

U.S. PATENT DOCUMENTS

| | | | |
|---|---|---|---|
| 683,414 | 9/1901 | Sibley | 24/193 |
| 3,354,620 | 11/1967 | Scholl et al. | 55/304 |
| 3,724,178 | 4/1973 | La Boeuf | 55/341 NT |
| 4,481,022 | 11/1984 | Reier | 55/378 |

Primary Examiner—Bernard Nozick
Attorney, Agent, or Firm—Charles D. Gunter, Jr.

[57] ABSTRACT

An improved filter bag assembly is shown for use in a filter bag housing having a plurality of filter bags, each of the filter bags being anchored at a lower end and being suspended within the bag housing in a tensioned relation by an upper end thereof. A bag spring is provided having a central coil, and a pair of angularly arranged spring sides extending outwardly from the coil. A hanger bracket is used to suspend the bag spring by engaging a selected spring side and the opposite spring side is engaged by a flexible strap attached to the bag upper end. The bag spring is tensionable between tensed and relaxed positions by applying force to the flexible strap free end, whereby relaxing the spring serves to tense the filter bag.

7 Claims, 4 Drawing Figures

FILTER BAG ASSEMBLY

BACKGROUND OF THE INVENTION

The present invention relates generally to a filter bag assembly of the type used in a filter housing designed to remove dust, dirt and other particulate matter from air or other gaseous medium and, specifically, to an improved tensioning mechanism and method for maintaining filter bags in tension within the filter housing.

Fabric filtration is one technique which has proved to be efficient in separating undesirable particulate matter from a gas stream in industrial environments. Such filtration is typically performed in a dust collection apparatus known in the art as a "bag house". The bag house can be described simply as a sheet metal housing divided into two chambers by a tube sheet. Cylindrical fabric filters are disposed within openings in the tube sheet. Particulate containing gas is blown into one chamber where dust accumulates on the fabric filter as the gas passes through the fabric into the other chamber and out an exhaust. The typical bag house arrangement has a plurality of cylindrical filter bags with closed upper ends which are vertically suspended in the clean air chamber from a bag support frame work. The lower ends of the bags are fixed to openings in the tube sheet. Filtration of gas occurs from inside to the outside of the bags.

When it becomes necessary to clean the filter cake from the fabric bags, the flow of process gas is temporarily interrupted so that reverse air can be forced from the clear air chamber to the dirty air chamber. The reverse flow of cleaning air causes the dust cake on the filter bags to be dislodged and fall through the interior of the bags to the dirty air chamber for removal. In some bag house installations, reverse air cleaning is enhanced by mechanically shaking the fabric filters.

Proper tensioning of the bags plays an important role in limiting fabric collapse during the cleaning process. If the bags are stretched too tightly between the supporting frame work and the tube sheet, the bags do not collapse during cleaning but suffer accelerated wear. If the bags are installed too loosely, then the fabric collapses during cleaning and will not permit the dust cake to fall through the bag to the bottom of the dirt chamber.

The installation and maintenance of filter bags of the type used in bag houses has traditionally been a time consuming and costly operation. Prior bag designs have, in general, been difficult to service for purposes of rejuvenation, replacement and installation. A need exists for an improved filter bag assembly and mounting technique which would alleviate the various installation and maintenance problems which have been encountered in the past.

SUMMARY OF THE INVENTION

An improved filter bag assembly is shown for a filter housing having a plurality of filter bags, each of the filter bags being anchored at a lower end and being suspended within the housing in tensioned relation by an upper end thereof. The assembly includes a bag spring having a central coil, and a pair of angularly arranged spring sides extending outwardly from the coil. The spring is tensionable between tensed and relaxed positions. Anchor means suspended within the filter housing are engageable with a selected one of the spring sides for supporting the spring in vertical fashion within the filter housing. A flexible strap is attached at one end to the upper end of the filter bag and has an opposite, free end. Clasp means are provided, as a part of the spring, for engaging the strap free end for tensing the bag, whereby relaxing the spring serves to tense the filter bag. The bag spring is preferably a butterfly-shaped member having a central, helical coil having a pair of angularly arranged spring sides extending outwardly from the coil and having a loose spring arm.

In the method of installing a filter bag within the filter housing, the bag lower end is first anchored within the filter housing. The bag spring is suspended within the filter housing by means of the hanger and the filter bag is placed in tension by looping the strap free end between the string side which is not engaged by the hanger and the loose arm of the spring. The filter bag is then placed in tension by pulling downward on the free end of the bag strap, thereby exerting force in the opposite direction of the forces exerted by the relaxed butterfly-shaped spring sides. The filter bag can be removed from within the filter housing by cutting the flexible bag strap and allowing the bag to collapse. The bag is then removed by removing the bag lower anchor and removing the remaining bag strap from the bag spring.

Additional objects, features and advantages will be apparent in the written description which follows.

DETAILED DESCRIPTION OF THE INVENTION

Figure 1:
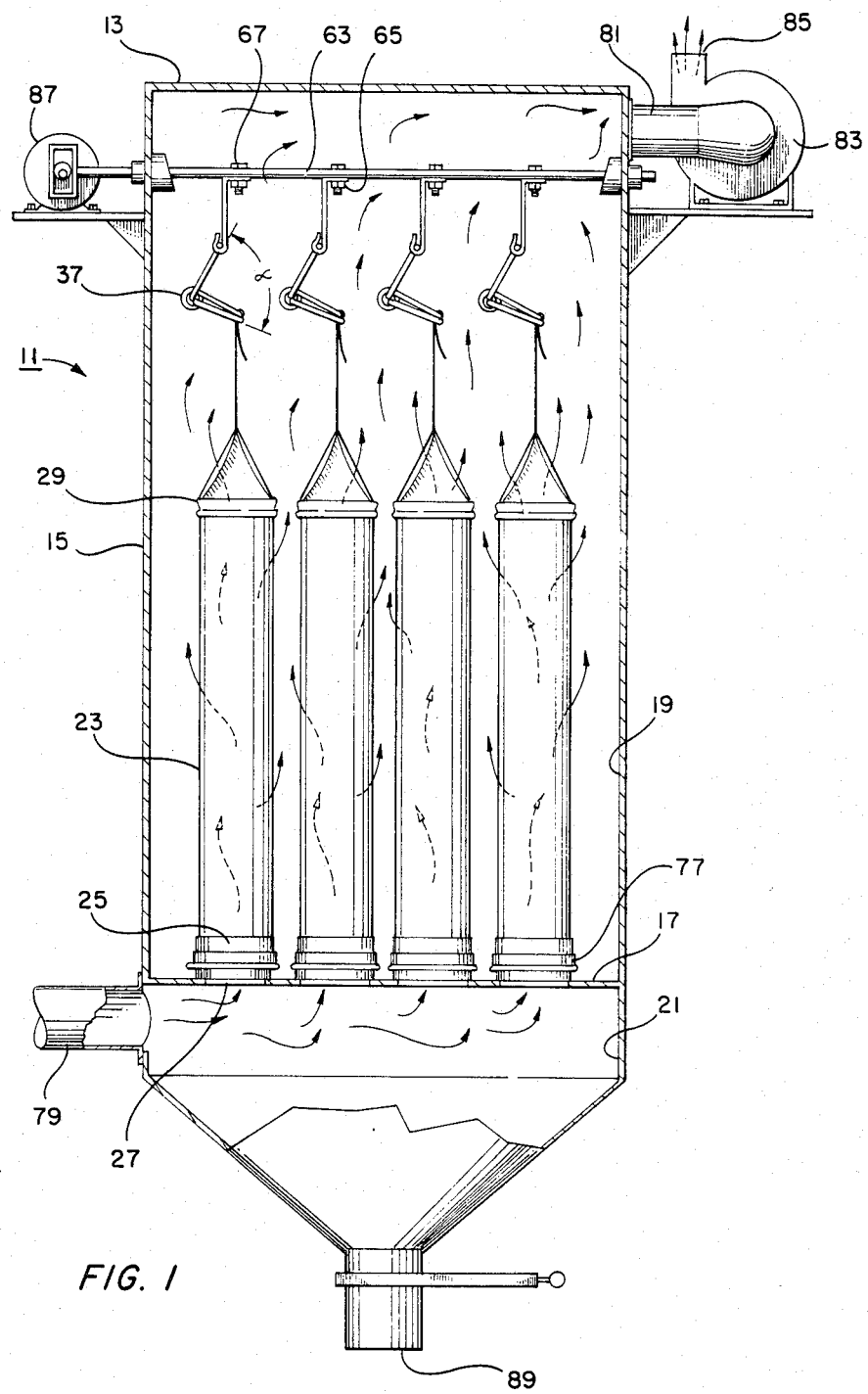
FIG. 1 is a side, partial, cross-sectional view of a filter housing showing the installation of a filter bag assembly of the invention.

FIG. 1 shows a filter bag assembly designated generally as 11 in place within a filter housing 13. The filter housing 13, sometimes referred to as a "bag house", includes a metal frame 15 which is divided by a tube sheet 17 into an upper chamber 19 and a lower chamber 21. A plurality of filter bags 23 are suspended within the filter housing 13, each of the bags 23 being anchored at the lower end 25 about an opening 27 in the tube sheet and being suspended within the housing in tensioned relation by an upper end 29.

Figure 2:
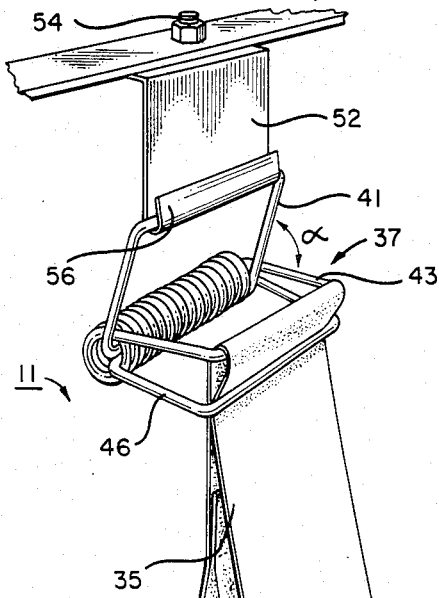
FIG. 2 is a close-up, perspective view of the upper end of a filter bag showing the tensioning spring of the invention.

The filter bag assembly 11 is shown greater detail in FIG. 2. The filter bag assembly 11 includes a fabric bag 31 having a generally cylindrical body, the lower end 25 of which includes a metal band or clamp for attachment to the tube sheet (See FIG. 1). The bag upper end 29 includes a rigid ring, preferably made of stainless steel or carbon steel, which is sewn into the bag top. The bag end 33 which extends upwardly from the reinforced upper end 29 is placed into a tent-like shape and has a fabric strap 35 attached thereto. Other bag end constructions can be envisioned as well, such as the use of a hard disk which would be sewn into the bag top instead of using the ring and pleated end construction. In such a case, the fabric strap 35 would connected directly to the bag top.

Figure 3:
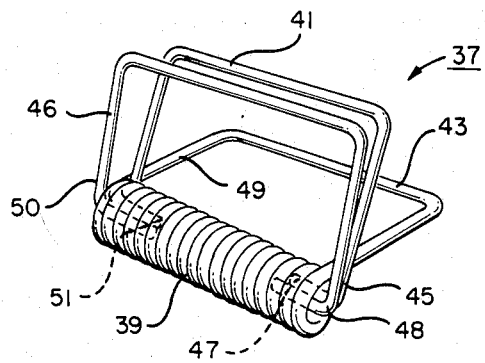
FIG. 3 is an isolated, perspective view of the butterfly-shaped, tensioning spring of the invention.

A butterfly-shaped bag spring 37 is provided for maintaining the bag 23 in tensioned relation within the filter housing 13. As shown in FIG. 3, the bag spring 37 includes a central, helical coil 39 and a pair of angularly arranged spring sides 41, 43 extending outwardly from the coil 39. The spring 37 is formed from a continuous length of wire, the length of wire being formed as a helical coil having an end portion 45 bent into two right angles and terminating in a first spring end 47 (shown in dotted lines in FIG. 3) which extends within the coiled diameter. The coil 39 also has an opposite end portion 49 which is bent into two right angles and which terminates in an opposite spring end 51 (shown in dotted lines in FIG. 3) which extends within the coiled diameter in the opposite direction from the first spring end 47.

The spring sides 41, 43, as shown in FIG. 2, form an angle indicated as alpha with respect to the central coil 39. The spring 37 can be tensed by varying the angle alpha formed between the spring sides 41, 43. The spring 37 can be "cocked" by increasing the angle alpha as viewed in FIG. 2. The spring 37 tends to relax once the cocking force is removed by decreasing the angle alpha as viewed in FIG. 2.

As shown in FIG. 3, the spring 37 also includes a loose spring arm 46 which is formed from a separate, shorter length of wire, and which has opposing end portions 48, 50 which are received within the coil diameter so that the loose spring arm 46 is free to move within the coiled diameter.

Figure 4:
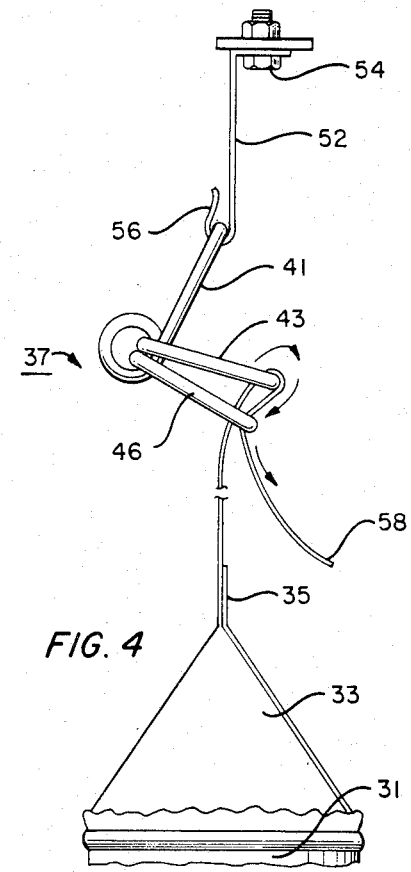
FIG. 4 is a close-up, perspective view of the upper end of the filter bag of FIG. 2 from a different angle, showing the engagement of the bag strap.

As shown in FIGS. 2 and 4, a rigid hanger 52 is suspended within the filter housing, as by a nut and bolt 54 and is engageable with a selected one of the spring sides 41 for supporting the spring within the filter housing. The rigid hanger 52 is preferably a sheet metal bracket which is mounted at one extent within the filter bag housing in vertical fashion and which has an opposite curved portion 56 for receiving and supporting the bag spring side 41. There could be other rigid hanger constructions as well such as "S" shaped hangers, etc.

As shown in FIGS. 2 and 4, the bag strap 35 is attached to the bag end 33 and terminates in a free end 58. The flexible strap 35 is engageable with the bag spring 37 by looping the free end 58 between the bag spring side 43 and the loose arm 46, whereby the bag is tensed by pulling the free end 58 through the "clasp" so formed to thereby decrease the distance between the filter bag upper end 29 and the bag spring 37. As shown in FIG. 4, this is accomplished by passing the strap free end around the loose arm 46 and spring side 43, over the top of the spring side 43, looping the free end between the spring side 43 and free arm 46, and pulling the free end 58 to form a clasp for the flexible strap 35. In this manner, by merely pulling the loose end 58 of the strap 35 in the downward direction, the bag spring 37 is extended. Once the force is relieved on the loose end 58, the spring 37 tends to relax, thereby properly tensioning the bag 31.

The operation of the invention will now be described. Applicant's filter bag assembly is supplied as a unit with a bag 23, and flexible strap 35 extending from the reinforced bag upper end 29. The bag lower end 25, as shown in FIG. 1, is anchored to the tube plate 17 by a clamp 77. The hanger bracket 52 is in place on the hanger 63. The bag spring 37 would then be suspended from the hanger 52 by placing a selected spring side 41 within the curved portion 56 of the bracket 52. The bag spring 37 would then be tensed or "cocked", by looping the flexible strap free end 58 between the opposite spring side 43 and free arm 46, as has been described. Once the force is relieved on the strap free end 58, the bag spring 37 tends to relax by decreasing the angle alpha shown in FIG. 2, thereby placing the filter bag 31 in tension.

Dirty gas would then typically enter the housing 13 through an inlet 79 and would pass through the openings 27 in the tube sheet 17 and pass up the bag's interiors and out the sides thereof into the upper chamber 19 as shown by the arrows in FIG. 1. The clean gas from which the particulate matter has been removed would then be pulled through an outlet 81 as by a fan 83 and would be recirculated through a duct 85.

Periodically, a cleaning cycle is preformed by cutting off the gas passing into the inlet 79, reversing the gas flow through the housing 13, and/or activating a shaker motor 87 which would reciprocate the hanger 83. The dust or other particulate matter which has accumulated within the bag 23 would then fall down into the lower chamber 21 and pass out an exhaust conduit 89.

An invention has been provided with several advantages. The filter bag of the invention is provided as a unit with a strap sewn into the assembly. The bag top of the invention costs less to manufacture than previous bag designs. The pleated bag end is also permanently attached, as is the bag strap, and is less expensive than hanger rods, and the like, used in prior designs. A selected spring side can be snapped into the curved portion of the hanger bracket to provide for more economic bag replacement than prior designs. The bag is conveniently removed by simply cutting the old bag strap, thereby allowing the assembly to fall to the tube sheet. The bag lower end would then be unfastened and the old bag and remaining strap portion would be removed. The new bag would be installed, as has been previously described.

Applicant's invention eliminates the expensive and time consuming operations required in the past to remove bag caps from old bags, clean old bag caps, and install clean caps into the new bag. Applicant's invention also greatly simplifies the procedure of a tool list mechanical installation and tensioning of the bag assembly. Applicant's tension spring is on the outside of the bag in the clean air portion of the filter housing. Applicant's spring is virtually self cleaning with its normal motion during use in the filter housing.

During installation and to replacement of applicant's assembly, all components are in plain view, whereas in presently used systems, portions of the work to be done are required to be accomplished in confined spaces, sometimes out of sight. Bag life is extended with applicant's device due to elimination of bag sagging or collapsing of the bag lower end which insures full reverse air flow and proper removal of particulate from the bag interior.

While the invention has been shown in only one of its forms, it is not thus limited but is susceptible to various changes and modifications without departing from the spirit thereof.

I claim:

1. A method of installing a filter bag within a filter bag housing to maintain the bag in tensioned relationship, the filter bag having an upper end which terminates in a flexible strap having a strap free end, comprising the steps of:

anchoring a lower end of the filter bag within the filter housing;

mounting a hanger within the filter housing;

suspending a bag spring from the hanger within the filter housing, the bag spring being provided with a central coil, a pair of angularly arranged spring sides extending outwardly from said coil, and a loose spring arm, said spring being tensionable between tensed and relaxed positions by varying the angle between said spring sides, a selected one of said spring sides being engaged with said hanger;

attaching said bag strap free end to said bag spring side not engaged by said hanger by looping said flexible strap between said spring side and said loose spring arm to thereby clasp said strap free end within said side and arm;

pulling on the flexible strap free end to decrease the distance between the bag upper end and the bag spring; and placing the filter bag in tension by relaxing the spring.

2. The method of claim 1, wherein hanger is supported in vertical fashion within the interior of the filter bag housing and wherein the spring is suspended from the hanger by inserting said selected spring side into curved portion of the hanger.

3. The method of claim 2, further comprising the steps of:

removing the filter bag from within the filter bag housing by cutting the flexible bag strap and allowing the bag to collapse, removing the bag lower anchored end, and removing the remaining strap from the spring side and loose arm.

4. An improved filter bag assembly for a filter housing, comprising:

at least one filter bag having a lower end which is anchored within said filter housing and having an upper end;

a flexible strap attached at one end to the upper end of said bag and having an opposite free end;

a bag spring having a central coil, a pair of angularly arranged spring sides which extend outwardly from said coil and which are movable between tensed and relaxed positions, and a loose spring arm extending outwardly from said coil, a selected one of said spring sides together with said loose spring arm comprising clasp means engaging said free end of said flexible strap; and hanger means suspended within said filter housing and engaging the remaining bag spring side to support said bag spring within said filter housing, said flexible strap being engaged with said clasp means with said bag spring in said tensed position, whereby relaxing said spring serves to tense said filter bag.

5. An improved filter bag assembly for a filter housing, comprising:

at least one filter bag having a lower end which is anchored within said filter housing and having an upper end;

a reinforced bag end extending upwardly from said filter bag upper end into a flexible strap, said strap having an opposite free end;

a butterfly-shaped bag spring having a central helical coil, a pair of angularly arranged spring sides which extend outwardly from said coil and which are movable between tensed and relaxed positions by varying the angle formed between said spring sides, and a loose spring arm extending outwardly from said coil, a selected one of said spring sides together with said loose spring arm comprising clasp means engaging said free end of said flexible strap; and a rigid hanger suspended within said filter housing and engaging the remaining bag spring side to support said bag spring within said filter housing, said flexible strap being engaged with said clasp means with said bag spring in said tensed position, whereby relaxing said spring serves to tense said filter bag.

6. The improved filter bag assembly of claim 5, wherein said butterfly-shaped spring is formed from a continuous length of wire, said length of wire being formed as a helical coil having an end portion bent into two right angles and terminating in a first spring end which extends within said coil diameter, and said coil having an opposite end portion bent into two right angles and terminating in an opposite spring end which extends within the coil diameter in the opposite direction from the first spring end, and said loose spring arm being formed from a separate, shorter length of wire, said loose spring arm having opposing end portions bent at two right angles and received with said coil diameter.

7. The improved filter bag assembly of claim 6, wherein the rigid hanger is a sheet metal bracket which is mounted at one extent within the filter bag housing in vertical fashion and which has an opposite curved portion for receiving and supporting said bag spring side.

* * * * *